(12) United States Patent
Mikami et al.

(10) Patent No.: US 6,657,202 B2
(45) Date of Patent: Dec. 2, 2003

(54) MULTIPLE-EYE TYPE DOSE DISTRIBUTION MEASURING METHOD

(75) Inventors: Satoshi Mikami, Naka-gun (JP);
Hirohide Kobayashi, Naka-gun (JP);
Mitsuru Kamei, Mito (JP)

(73) Assignee: Japan Nuclear Cycle Development Institute, Ibaraki-ken (JP)

( * ) Notice: Subject to any disclaimer, the term of this patent is extended or adjusted under 35 U.S.C. 154(b) by 159 days.

(21) Appl. No.: 09/879,123

(22) Filed: Jun. 13, 2001

(65) Prior Publication Data

US 2001/0052571 A1 Dec. 20, 2001

(30) Foreign Application Priority Data

Jun. 19, 2000 (JP) ........................................ 2000-183256

(51) Int. Cl.[7] ................................................. G01T 1/00
(52) U.S. Cl. ..................................... 250/394; 250/336.1
(58) Field of Search ........................... 250/252.1, 336.1, 250/394, 366, 491.1, 393

(56) References Cited

U.S. PATENT DOCUMENTS 5,214,281 A * 5/1993 Rowe ........................ 250/253
5,430,308 A * 7/1995 Feichtner et al. ........... 250/580

* cited by examiner

Primary Examiner—David Porta
Assistant Examiner—Christine Sung
(74) Attorney, Agent, or Firm—Wenderoth, Lind & Ponack, L.L.P.

(57) ABSTRACT

A dose distribution-measuring method capable of grasping a three-dimensional form of an object to be measured or evaluating a three-dimensional dose distribution thereof. The method comprises providing a multiple-eye type radiation meter probe in which at least two directional radiation detectors are arranged so as to be spaced from each other and directed toward a point to be measured; and carrying out dose measurement by directing the radiation meter probe toward an object to be measured from different positions to thereby determine a three-dimensional dose distribution of the object to be measured. Each of the radiation detectors has a structure in which a periphery of the radiation detector main body, except for a detection surface thereof, is surrounded by a radiation shield to reduce the effect of radiation from other than the object to be measured and from Compton scattering.

21 Claims, 2 Drawing Sheets

MULTIPLE-EYE TYPE DOSE DISTRIBUTION MEASURING METHOD

BACKGROUND OF THE INVENTION

The present invention relates to a multiple-eye type dose distribution measuring method capable of grasping a three-dimensional form of an object to be measured or remotely evaluating a three-dimensional dose distribution by using a multiple-eye type radiation meter probe.

The conventional radiation meter probe used in radiation measurement is so-called a single-eye type radiation meter probe having a single radiation detector to measure only a dose distribution on a surface of an object to be measured. Consequently, in the case where the object to be measured is a planar surface (two-dimensional surface), the dose distribution can be determined by measuring the surface at a multiplicity of points and transcribing the result thereof to a planar graph.

As the radiation detector main body, a scintillation detector, a semiconductor detector or the like has been generally used.

In various research facilities or nuclear reactor facilities dealing with radioactive substances, there are cases of desiring to measure a three-dimensional form or distribution of the radioactive substance. These cases include, for example, remote measurement of radioactive facilities prior to demolition thereof or dose distribution measurement of a fuel assembly. When facilities containing high-level radioactive substances are demolished, it will helpful for improving safety and efficiency, if a three-dimensional form and dose distribution of the radioactive substance can be grasped in advance. Also, it is possible to efficiently design a waste storage scheme in advance. Furthermore, if the dose distribution of equipment in nuclear facilities is grasped without demolition, maintenance scheme can be properly planned.

However, in the foregoing conventional method, it has been difficult for a solid (three-dimensional) object to be measured to grasp a three-dimensional shape thereof. Moreover, in the conventional measuring method, it has been impossible to measure a shape or dose distribution of a radioactive substance contained within a vessel. Thus, it is impossible to cope with the desire to measure a three-dimensional form or dose distribution of the radioactive substance as described above.

SUMMARY OF THE INVENTION

It is an object of the present invention to provide a multiple-eye type dose distribution measuring method capable of grasping a three-dimensional form of an object to be measured or evaluating a three-dimensional dose distribution thereof.

According to the present invention, there is provided a multiple-eye type dose distribution measuring method comprising providing a multiple-eye type radiation meter probe in which at least two directional radiation detectors are arranged so as to be spaced from each other and directed toward a point to be measured; and carrying out dose measurement by directing the radiation meter probe toward Man object to be measured from different positions to thereby determine a three-dimensional dose distribution of said object to be measured.

The radiation detector preferably used in the present invention has a structure in which a periphery of the radiation detector main body, except for a detection surface thereof, is surrounded by a radiation shield to reduce the effect of radiation from other than the object to be measured and from Compton scattering. The multiple-eye type radiation meter probe preferably has a structure in which a holding angle of the radiation meter probe is changeable so as to have a shortest distance to the point to be measured. It is preferable to use a radiation meter probe in which two radiation detectors are arranged to be movable and changeable in their setting angle so that the point to be measured and two detectors are positioned at vertexes of an equilateral triangle or an isosceles triangle. By using such a radiation meter probe, later analytic operations are facilitated.

PREFERRED EMBODIMENTS OF THE INVENTION

The method of the present invention is to be applied to measurement of a three-dimensional form and distribution of a radioactive substance, remote measurement of radioactive facilities prior to demolition thereof, dose distribution measurement of a fuel assembly, or survey and dose distribution measurement in a contaminated site.

The radiation detector main body used in the present invention is to be selected in accordance with the kind of a radiation ray to be measured. However, for the most popular γ-ray, a scintillation detector for γ-ray or a semiconductor detector is preferable. In particular, the semiconductor detector is most suited because of the reason that it is compact and to be arranged comparatively freely. The shape of a radiation detector main body may be a disk form or a cylindrical form. A periphery of the radiation detector main body thereof is surrounded by a radiation shield and only a detection surface thereof is exposed so as to cut radiation from directions other than a predetermined direction and provide the radiation detector with directivity.

Figure 1:
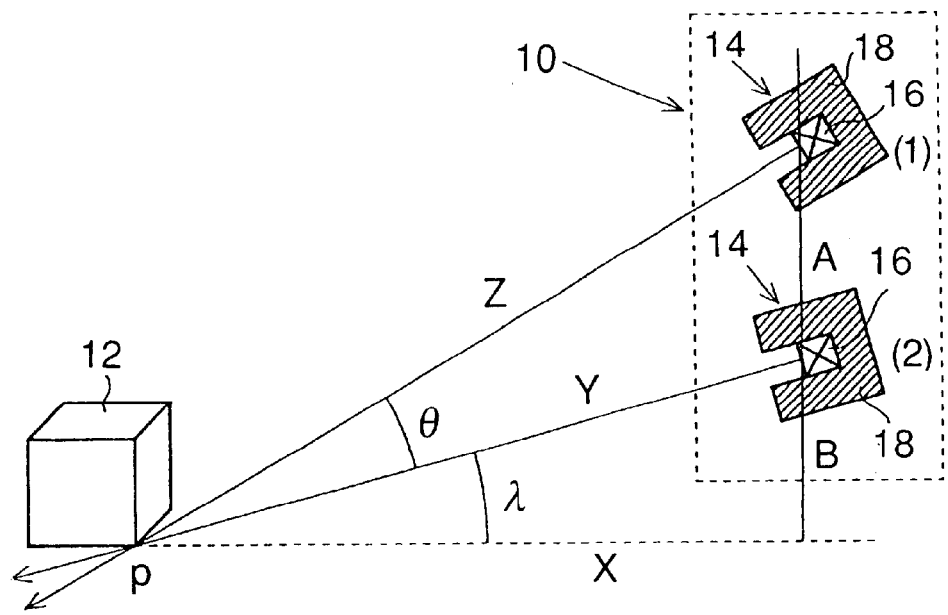
FIG. 1 is an explanatory view showing an embodiment of a multiple-eye type radiation meter probe used in the present invention.

FIG. 1 is an explanatory view showing an embodiment of a multiple-eye type radiation meter probe used in the present invention. By directing the multiple-eye type radiation meter probe 10 toward an object 12 to be measured from different positions, a three-dimensional dose distribution of the object 12 to be measured is determined. FIG. 1 shows a situation of carrying out dose measurement directing to the object 12 from a particular position.

The multiple-eye type radiation meter probe 10 has two directional radiation detectors 14 which are arranged so as to be spaced from each other by a predetermined distance and directed toward a point to be measured. Each of the radiation detectors 14 has a structure in which a periphery of a radiation detector main body 16, except for a detection surface thereof, is surrounded by a radiation shield 18 and the effect of radiation from other than the object 12 and from Compton scattering is reduced to enhance the directivity. A semiconductor detector is used as the radiation detector main body 16 and a cylindrical member made of lead closed at one end is used as the radiation shield 18.

The both radiation detectors 14 are changeable in their setting angle (direction). Also, they are movably arranged so as to freely adjust a spacing distance A between them.

In FIG. 1, provided that a distance from a reference line (dotted line) passing a point p to be measured to a detection position (1) is (A+B), an angle defined by them is (θ+λ), a distance from the point p to be measured to the detection position (1) is Z, a distance from the reference line passing the point p to be measured to a detection position (2) is B, an angle defined by them is λ, a distance from the point p to be measured to the detection position (2) is Y and a length of the reference line is X, there is a relationship as:

$$\tan(θ+λ)=(A+B)/X$$

$$\cos λ=X/Y$$

$$\sin(θ+λ)=(A+B)/Z.$$

Accordingly, the respective radiation counts in both radiation detector main bodies 16 (at detection positions (1) and (2)) are equal if correction is conducted with respect to the distance.

Even where the object to be measured is in three-dimensional form, it is possible to substantially recognize a depth similarly to the human eyes by juxtaposing two radiation detectors 14 to construct the multiple-eye type structure as shown in FIG. 1. Therefore, accurate measurement is possible at the point to be measured. If necessary, three or more radiation detectors may be juxtaposed.

Figure 2:
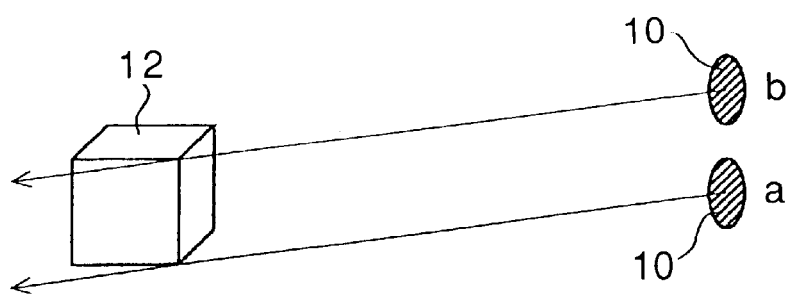
FIG. 2 is an explanatory view showing an embodiment of a multiple-eye type dose distribution measuring method according to the present invention.

FIG. 2 is an explanatory view showing an embodiment of the multiple-eye type dose distribution measuring method according to the present invention. In the method of the present invention, dose measurement is carried out by directing the multiple-eye type radiation meter probe 10 toward the object 12 to be measured from different positions. For example, by sequentially moving the multiple-eye type radiation meter probe 10 to a multiplicity of different positions, i.e. measuring position a, measuring position b, and so on, a shape of the object 12 can be first grasped. This is because a position where the values measured by both radiation detectors in the radiation meter probe 10 become equal defines a boundary of the object to be measured as shown in FIG. 1 and thus, by sequentially defining such boundaries, a shape of the object to be measured can be depicted. If the object to be measured is cubic, for example, the radioactive intensity at the center thereof and that at a point distant from the center are different. In many cases, the radioactive intensity of a lump of radioactive substance (an object to be measured) is greatly different at an interior of the lump and a periphery thereof. Accordingly, the shape of the lump is roughly measured and thereafter the dose distribution inside of the lump is measured spending more time (increasing measuring positions).

In the meanwhile, if the concentration distribution of the radioactive substance of the object to be measured is uniform, the measured results are equal at any point on the object to be measured by correcting a distance between the object to be measured and the radiation meter probe as well as a length of the object to be measured (a linear distance from an arbitrary point in a volume of the object to be measured to a surface thereof). However, in the case where the concentration distribution of the radioactive substance of the object to be measured is ununiform, measured results at a same point are different in value because an integrated value on the object to be measured has been measured.

Specifically, in FIG. 1, the measured result at the detection position (1) represents a radiation dose of the radioactive substance on line Z and the measured result at the detection position (2) represents a radiation dose of the radioactive substance on line Y. Consequently, in the case where the concentration of the radioactive substance of the object to be measured is different, different measured results are obtained even in a same point because the measured results at the detection positions (1) and (2) are integrated values at these detection positions. However, the measured result represents an average value of the radiation intensity on each line of the object to be measured. Since the shape of the radioactive substance is revealed the internal radiation intensity can be measured by measuring the object to be measured at many layers.

Figure 3:
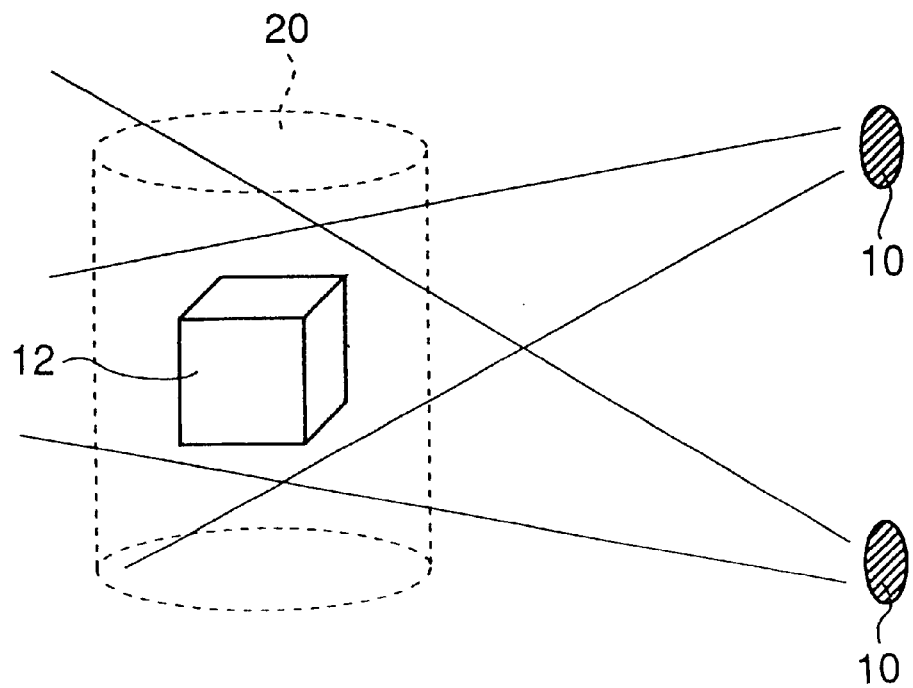
FIG. 3 is an explanatory view showing a measurement example in the case where the shape of an object to be measured is unknown.

FIG. 3 shows a measurement example in the case where the shape of an object to be measured is unknown. There are cases where confirmation on the radiation intensity or the shape of the object 12 to be measured is desired, although the object 12 is within a vessel 20 or the like and the shape thereof is unknown from the outside. In this case, measurement is made using the multiple-eye type radiation meter probe 10 from the outer circumference of the vessel 20 to determine the internal radiation dose or the shape of the object 12. In the procedure, the multiple-eye type radiation meter probe 10 is used to first examine a boundary of presence and absence of the radiation intensity (measured results are greatly different between at a position the radioactive substance is present and a position of absence thereof). By revealing the boundary, the size and the shape of the object to be measured is determined. Next, average doses are sequentially measured on lines of slicing the object to be measured, thereby determining the internal distribution of the object to be measured by calculation.

The multiple-eye type radiation meter probe preferably has a structure in which a holding angle of the radiation meter probe is changeable so as to have a shortest distance to the point to be measured. It is preferable to use a radiation meter probe in which two radiation detectors are arranged to be movable and changeable in their setting angle so that the point to be measured and two detectors are positioned at vertexes of an equilateral triangle or an isosceles triangle. By using such a radiation meter probe, later analytic operations are facilitated.

As described above, since the present invention is a method in which dose measurement is conducted by directing to an object to be measured a multiple-eye type radiation meter probe having at least two directional radiation detectors arranged to be spaced from each other, it is possible to grasp a shape of the object to be measured even in a three-dimensional form and analyze and evaluate the concentration distribution of the object to be measured having a three-dimensional form. Also, it is possible to grasp the shape and the concentration distribution of the object to be measured which is buried in a vessel or wall and the shape of which is unknown.

According to the method of the present invention, since the shape and the dose distribution of a high-level radioactive substance can be grasped prior to demolition thereof, safety and efficiency is improved. Also, a waste storage scheme can be effectively designed in advance. Furthermore, since the dose distribution of equipment in nuclear facilities can be grasped without demolition, maintenance plan can be prepared correctly.

What is claimed is:

1. A multiple-eye type dose distribution measuring method for determining the three-dimensional dose distribution of an object, said method comprising:

providing a multiple-eye type radiation meter probe in which at least two directional radiation detectors are arranged so as to be spaced from each other, wherein each of said at least two directional radiation detectors can be directed toward a point on the object; and moving said radiation meter probe to a plurality of different measuring positions in order to perform a dose measurement of the object from of each of the plurality of different measuring positions to thereby determine a three-dimensional dose distribution of the object.

2. The multiple-eye type dose distribution measuring method according to claim 1, wherein each of said directional radiation detectors has a structure in which a periphery of the radiation detector main body, except for a detection surface thereof, is surrounded by a radiation shield to reduce the effect of radiation from other than the object and from Compton scattering.

3. The multiple-eye type dose distribution measuring method according to claim 2, wherein said multiple-eye type radiation meter probe has a structure in which a holding angle of the radiation meter probe is changeable so as to have a shortest distance to the point on the object.

4. The multiple-eye type dose distribution measuring method according to claim 2, wherein said two directional radiation detectors are arranged so as to be movable and changeable in their setting angle so that the point on the object and said two directional radiation detectors are positioned at vertexes of an equilateral triangle or an isosceles triangle.

5. The multiple-eye type dose distribution measuring method according to claim 1, wherein said multiple-eye type radiation meter probe has a structure in which a holding angle of the radiation meter probe is changeable so as to have a shortest distance to the point on the object.

6. The multiple-eye type dose distribution measuring method according to claim 5, wherein said two directional radiation detectors are arranged so as to be movable and changeable in their setting angle so that the point on the object and said two directional radiation detectors are positioned at vertexes of an equilateral triangle or an isosceles triangle.

7. The multiple-eye type dose distribution measuring method according to claim 1, wherein said two directional radiation detectors are arranged so as to be movable and changeable in their setting angle so that the point on the object and said two directional radiation detectors are positioned at vertexes of an equilateral triangle or an isosceles triangle.

8. A multiple-eye type dose distribution measuring method for determining the shape of an object, said method comprising:

providing a multiple-eye type radiation meter probe in which at least two directional radiation detectors are arranged so as to be spaced from each other, wherein each of said at least two directional radiation detectors can be directed toward a point on the object;

moving said radiation meter probe to a plurality of different measuring positions in order to perform a dose measurement of the object from each of the plurality of different measuring positions to thereby determine boundary points of the object, wherein each boundary point of the object is a point at which each of said at least two directional radiation detectors detect a respective equal dose measurement; and moving said radiation meter probe to a plurality of different measuring positions relative to the detected boundary points in order to perform a dose measurement of the object from each of the plurality of different measuring positions relative to the detected boundary points to thereby determine a three-dimensional dose distribution of the object.

9. The multiple-eye type dose distribution measuring method according to claim 8, wherein each of said directional radiation detectors has a structure in which a periphery of the radiation detector main body, except for a detection surface thereof, is surrounded by a radiation shield to reduce the effect of radiation from other than the object and from Compton scattering.

10. The multiple-eye type dose distribution measuring method according to claim 9, wherein said multiple-eye type radiation meter probe has a structure in which a holding angle of the radiation meter probe is changeable so as to have a shortest distance to the point on the object.

11. The multiple-eye type dose distribution measuring method according to claim 9, wherein said two directional radiation detectors are arranged so as to be movable and changeable in their setting angle so that the point on the object and said two directional radiation detectors are positioned at vertexes of an equilateral triangle or an isosceles triangle.

12. The multiple-eye type dose distribution measuring method according to claim 8, wherein said multiple-eye type radiation meter probe has a structure in which a holding angle of the radiation meter probe is changeable so as to have a shortest distance to the point on the object.

13. The multiple-eye type dose distribution measuring method according to claim 12, wherein said two directional radiation detectors are arranged so as to be movable and changeable in their setting angle so that the point on the object and said two directional radiation detectors are positioned at vertexes of an equilateral triangle or an isosceles triangle.

14. The multiple-eye type dose distribution measuring method according to claim 8, wherein said two directional radiation detectors are arranged so as to be movable and changeable in their setting angle so that the point on the object and said two directional radiation detectors are positioned at vertexes of an equilateral triangle or an isosceles triangle.

15. A multiple-eye type dose distribution measuring method for determining the shape of an obstructed object whose shape is visually obstructed by an obstructing object, said method comprising:

providing a multiple-eye type radiation meter probe in which at least two directional radiation detectors are arranged so as to be spaced from each other, wherein each of said at least two directional radiation detectors can be directed toward the obstructed object;

moving said radiation meter probe to a plurality of different measuring positions in order to perform a dose measurement of the obstructed object from each of the plurality of different measuring positions to thereby determine boundary points of the obstructed object, wherein each boundary point of the obstructed object is a point at which a presence of radiation intensity is detected is adjacent to a point at which an absence of radiation intensity is detected; and moving said radiation meter probe to a plurality of different measuring positions relative to the detected boundary points of the obstructed object in order to perform a dose measurement of the obstructed object from each of the plurality of different measuring positions relative to the detected boundary points of the obstructed object to thereby determine a three-dimensional dose distribution of the obstructed object.

16. The multiple-eye type dose distribution measuring method according to claim 15, wherein each of said directional radiation detectors has a structure in which a periphery of the radiation detector main body, except for a detection surface thereof, is surrounded by a radiation shield to reduce the effect of radiation from other than the object and from Compton scattering.

17. The multiple-eye type dose distribution measuring method according to claim 16, wherein said multiple-eye type radiation meter probe has a structure in which a holding angle of the radiation meter probe is changeable so as to have a shortest distance to the point on the object.

18. The multiple-eye type dose distribution measuring method according to claim 16, wherein said two directional radiation detectors are arranged so as to be movable and changeable in their setting angle so that the point on the object and said two directional radiation detectors are positioned at vertexes of an equilateral triangle or an isosceles triangle.

19. The multiple-eye type dose distribution measuring method according to claim 15, wherein said multiple-eye type radiation meter probe has a structure in which a holding angle of the radiation meter probe is changeable so as to have a shortest distance to the point on the object.

20. The multiple-eye type dose distribution measuring method according to claim 15, wherein said two directional radiation detectors are arranged so as to be movable and changeable in their setting angle so that the point on the object and said two directional radiation detectors are positioned at vertexes of an equilateral triangle or an isosceles triangle.

21. The multiple-eye type dose distribution measuring method according to claim 19, wherein said two directional radiation detectors are arranged so as to be movable and changeable in their setting angle so that the point on the object and said two directional radiation detectors are positioned at vertexes of an equilateral triangle or an isosceles triangle.

* * * * *

UNITED STATES PATENT AND TRADEMARK OFFICE
CERTIFICATE OF CORRECTION

PATENT NO. : 6,657,202 B2
DATED : December 2, 2003
INVENTOR(S) : Satoshi Mikami et al.

It is certified that error appears in the above-identified patent and that said Letters Patent is hereby corrected as shown below:

Title page,
Item [57], ABSTRACT,
Line 7, please replace "measured; and " with -- measured. The method further comprises --.

Column 1,
Lines 8 and 52, please replace "grasping" with -- determining --.
Line 13, please replace "so-called a" with -- a so-called --.
Lines 25-26, please replace "of desiring" with -- where it is desired --.
Line 29, please insert -- the -- before "demolition".
Line 31, please replace "will helpful" with -- will be helpful --.
Line 32, please replace "efficiency," with -- efficiency --.
Lines 33 and 36, please replace "grasped" with -- determined --.
Line 37, please insert -- a -- before "maintenance".
Line 40, please replace "to grasp" with -- in order to determine --.
Lines 56-57, please replace "comprising" with -- which comprises --.
Line 60, please replace "measured; and" with -- measured. The multiple-eye type dose distribution measuring method further comprises --; and please insert -- a -- before "dose".
Line 64, please replace "said" with -- the --.

Column 2,
Line 32, please insert -- the -- before "demolition".
Line 38, please insert -- a -- before "γ-ray".
Line 40, please replace "most" with -- best --.
Line 41, please replace "to" with -- because it can --.
Line 45, please replace "cut" with -- reduce --.
Line 54, please insert -- a -- before "dose measurement".
Line 54, please insert -- by -- before "directing", and please insert -- the multiple-eye type radiation meter probe 10 -- before "to".
Line 64, please insert -- so as -- before "to", and please insert -- of each of the radiation detectors 14 -- after "directivity".

Column 3,
Line 1, please replace "The both" with -- Both of the --.
Line 3, please replace "as to freely adjust" with -- that --, and please insert -- can be freely adjusted -- after "them".
Line 39, please replace "grasped" with -- determined --.

UNITED STATES PATENT AND TRADEMARK OFFICE
CERTIFICATE OF CORRECTION

PATENT NO. : 6,657,202 B2
DATED : December 2, 2003
INVENTOR(S) : Satoshi Mikami et al.

It is certified that error appears in the above-identified patent and that said Letters Patent is hereby corrected as shown below:

Column 3, (continued)
Line 41, please insert -- 14 -- after "detectors".
Line 52, please insert -- by -- after "measured".
Line 53, please insert "i.e., -- after "(".
Line 63, please replace "ununiform" with -- not uniform --.
Line 64, please replace "a" with -- the --, and please replace "are" with -- will be --.

Column 4,
Line 5, please replace "are" with -- will be --.
Line 6, please replace "in a" with -- at the --.
Line 15, please replace "on" with -- of --.
Line 25, please delete "at" before "a", and please add -- where -- before "the".
Lines 26-27, please replace "of absence thereof" with -- where the radioactive substance is not present --.
Line 38, please insert -- the -- before "two".
Line 44, please replace "to" with --, toward --, and please insert -- , -- after "measured".
Lines 47 and 50, please replace "grasp" with -- determine --.
Line 52, please replace "and" with -- where --.
Line 53, please replace "which" with -- such an object --.
Line 56, please replace "grasped" with -- determined --, and please insert -- the -- before "demolition".
Line 57, please insert -- thereby -- before "improved".
Line 60, please replace "grasped" with -- determined --, and please insert -- a -- before "maintenance" on lines 60-61.

Column 5,
Line 3, please replace "; and" with -- ; --.
Line 5, please replace "in order to perform" with -- ; and --, and please insert a paragraph break after "; and".
Line 8, please insert -- performing -- before "a dose".
Line 6, please insert -- at respective points on the object -- before "from" and please delete "of" before "each".
Line 56, please replace "in order to perform" with -- ; -- and please insert a paragraph break after ";".
Line 56, please insert -- performing -- before "a dose" and please insert -- at respective points on the object -- before "from".

UNITED STATES PATENT AND TRADEMARK OFFICE
CERTIFICATE OF CORRECTION

PATENT NO. : 6,657,202 B2
DATED : December 2, 2003
INVENTOR(S) : Satoshi Mikami et al.

It is certified that error appears in the above-identified patent and that said Letters Patent is hereby corrected as shown below:

Column 5, (continued)
Line 62, please replace "; and" with -- ; --.
Line 64, please replace "detected" with -- determined --.
Line 65, please replace "in order to perform" with --; and --, and please insert a paragraph break after ";".
Lines 65-66, please insert -- performing -- before "a dose" and please insert -- at respective points on the object -- before "from".
Line 67, please replace "detected" with -- determined --.

Column 6,
Line 50, please replace "in order to perform" with -- ; --, and please insert a paragraph break after ";".
Line 50, please insert -- performing -- before "a dose".
Line 51, please insert -- at respective points -- before "from".
Line 57, please replace "; and" with -- ; --.
Line 59, please replace "detected" with -- determined --.
Lines 60-61, please replace "in order to perform" with --; and -- and please insert a paragraph break after "and".
Line 61, please insert -- performing -- before "a dose".
Line 62, please insert -- object at respective points within the determined boundary points of the obstructed object -- before "from".

Signed and Sealed this

Tenth Day of August, 2004

JON W. DUDAS
*Acting Director of the United States Patent and Trademark Office*